Oct. 31, 1939.  J. R. MALEY ET AL  2,178,307
TRAVEL GUIDE
Filed April 11, 1939    2 Sheets-Sheet 1

Inventors
J. R. Maley.
W. S. Carver.
By Ross J. Woodward
Attorney

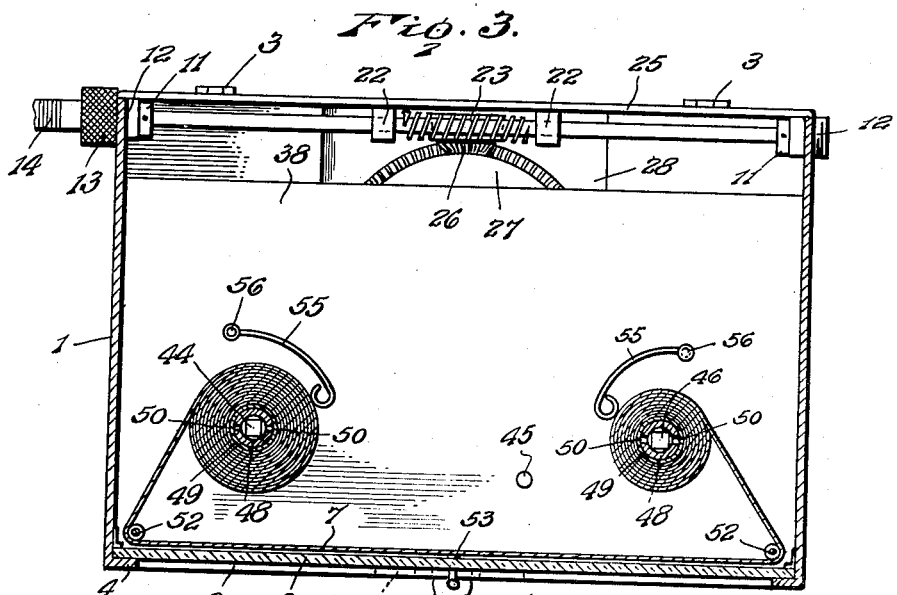
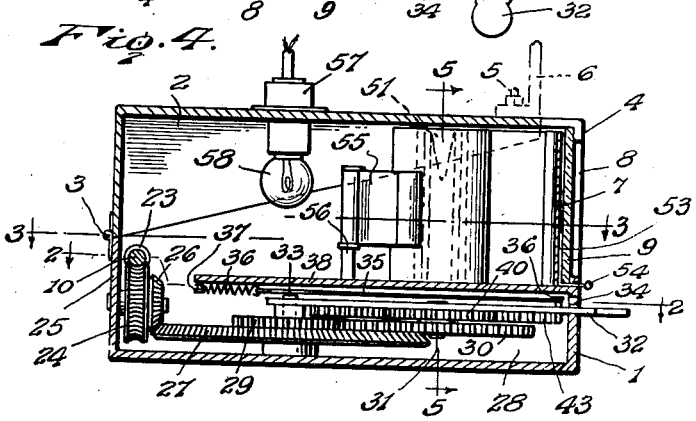
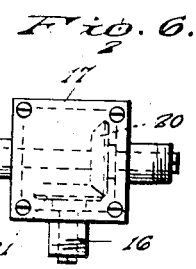
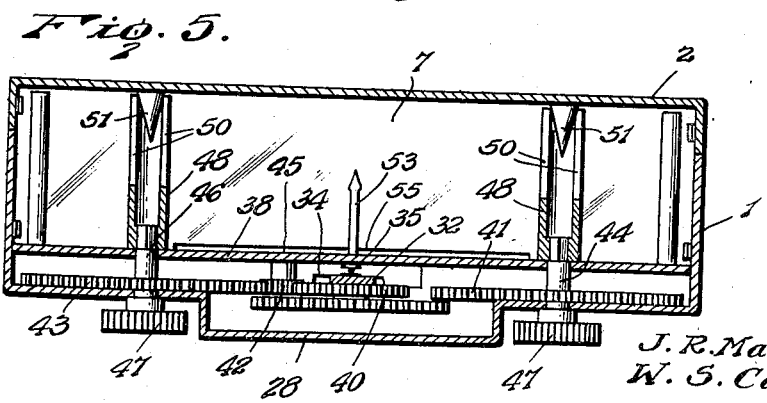

Patented Oct. 31, 1939

2,178,307

UNITED STATES PATENT OFFICE 2,178,307

TRAVEL GUIDE

Justice R. Maley and William S. Carver,
Portland, Oreg.

Application April 11, 1939, Serial No. 267,271

7 Claims. (Cl. 40—42)

This invention relates to a travel guide or map and it is one object of the invention to provide a device of this character including a casing adapted to be mounted under the instrument board of an automobile, where it may be easily seen, and a paper tape or strip mounted in the casing for movement across a sight opening at the exposed end thereof and bearing a diagrammatic representation of a road and indicia relating to the location of towns, hotels, gasoline stations, points of historic interest, and the like.

Another object of the invention is to provide a travel guide wherein spools for carrying the paper tape or strip are mounted in a casing and an improved train of gearing provided for selectively transmitting rotary motion to the spools, thus allowing the paper strip to be moved longitudinally across the sight opening or window in the proper direction according to the direction in which the automobile is moving along a road.

Another object of the invention is to so mount the spools that they may be easily removed and others applied to shafts carrying the spools. It will thus be seen that when a person is preparing for a trip, a spool carrying the proper strip may be obtained and mounted in the casing.

A further object of the invention is to so arrange the gearing that the operator of the motor vehicle may very easily make the proper adjustment to cause a selected one of the spools to be power driven and to the other run free, it being also possible to free both spools from the power drive and allow them to be turned manually so that the paper strip may be accurately set at the starting point of a trip.

Still another object of the invention is to provide a travel guide adapted to be driven by a flexible shaft in geared connection with the speedometer shaft, the gearing being so arranged that as a vehicle is driven along a road the paper strip will be moved across the window of the casing at the proper rate of speed to show the location of the vehicle along the road or roads depicted upon the paper strip.

And the invention has as a still further object to provide a device of this character having a casing which may be permanently mounted under the instrument board in a convenient position and its lower portion swung downwardly to an open position for insertion or removal of a paper strip without detaching the casing from the instrument board.

The invention is illustrated in the accompanying drawings, wherein:

Figure 3 is a sectional view taken along the line 3—3 of Figure 4.

Figure 4 is a sectional view taken vertically through the travel guide with the gearing shown in elevation.

Figure 5 is a vertical sectional view taken along the line 5—5 of Figure 4.

Figure 6 is a view of the coupling connecting the drive shaft of the travel guide with the speedometer shaft.

Figure 1:
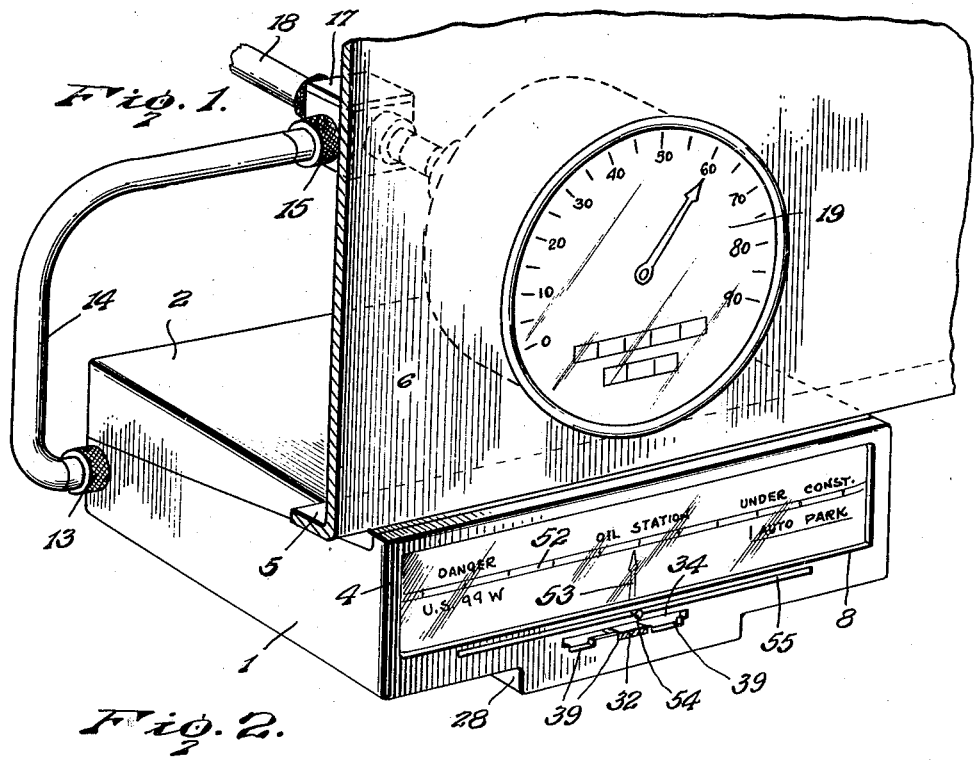
Figure 1 is a perspective view showing the improved travel guide mounted below the instrument board of an automobile.

This improved travel guide has a casing 1 formed of metal and provided with a cover or upper section 2 which is hinged to the casing, as shown at 3, and terminates in spaced relation to the end wall 4 of the casing so that when the cover is secured against the flange 5 of the instrument board 6 of an automobile or other motor vehicle, the casing may be swung downwardly to a lowered position for insertion or removal of a marked tape or paper strip 7 which is displayed through the sight opening or window 8 in the wall 4 of the casing. A sheet of glass 9 serves as a transparent closure for the sight opening and protects the portion of the strip 7 which is exposed through said opening. A latch or equivalent fastener is employed to releasably hold the casing in its raised or closed position.

Within the casing is a drive shaft 10 which extends transversely therein and has its end portions provided with coupler heads 11 journaled in bearings 12 at opposite sides of the casing. The bearings are externally threaded and to a selected one is detachably engaged the coupling 13 of a flexible shaft 14. This shaft is of a conventional construction and at its other end carries a coupling 15 for engaging the neck 16 of a gear housing 17 which is interposed in the flexible shaft 18 of the speedometer 19. Within the gear housing are intermeshing gears 20 and 21, and from an inspection of Figure 6 it will be readily seen that when an automobile is in motion and the speedometer is turning, rotary motion will be transmitted to the shaft 14 and from this shaft to the shaft 10. The drive shaft 10 of the travel guide will, therefore, be rotated whenever the automobile is in motion. Since the shaft 10 has coupler heads at both ends, the shaft 14 may be connected with either end, according to which is most convenient. It will be obvious that while the gear box 17 has been shown close to the speedometer, it may be located at any point within the length of the speedometer shaft.

Figure 2:
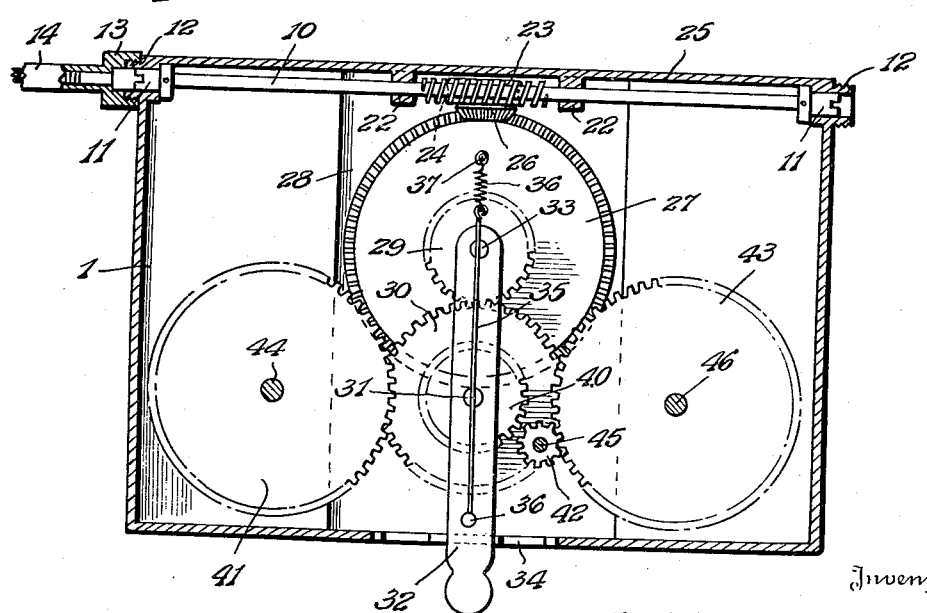
Figure 2 is a sectional view taken horizontally through the device along the line 2—2 of Figure 4.

The drive shaft 10 passes through bearings 22 and between these bearings carries a worm 23 which meshes with a worm gear 24. The gear 24 is rotatably mounted against the wall 25 of the casing and carries a beveled pinion 26 which meshes with a large beveled gear 27. This gear 27 is disposed horizontally and is rotatably mounted in a depression 28 formed midway the width of the bottom of the casing and extending the full length thereof between the front and rear ends of the casing. A spur gear 29 is formed concentric with the upper face of the beveled gear 27 and meshes with a larger spur gear 30 which is rotatably mounted by a pin or shaft 31 depending from a lever bar 32. This lever is pivotally mounted upon the shaft 33 of the gears 27 and 29 and is of such length that its free end portion projects outwardly through a slot 34 formed in the front wall 4 of the casing. A wire 35, which extends longitudinally of the lever, has one end secured to a pin 36 rising from the outer end portion of the lever and its rear end engaged with one end of a spring 37 depending from a plate 38 mounted horizontally in the casing in elevated position to the bottom of the casing, as shown in Figures 4 and 5. The lever is formed of resilient metal biased to cause it to engage in the notches or recesses 39 formed in the lower edge of the slot 34 and, when the lever is swung transversely from the neutral position shown in Figure 2, to one side or the other, movement of the wire and the spring 36 past a dead center will cause pull to be exerted, which will tend to retain the lever in its adjusted position and it will remain seated in one of the side recesses. When it is desired to move the lever from one position of adjustment to another, it is necessary to flex it upwardly and then swing it transversely to an adjusted position. After adjustment has been effected, pull of the spring 36 and engagement of the lever in one of the recesses 39, will hold the lever in set position and prevent accidental displacement of the lever.

The gear 30 carries a concentric spur gear 40 which is of less diameter than the gear 30 and projects from opposite sides of the lever 35 for meshing with either the large gear 41 or the small idler gear 42 which meshes with the large gear 43. The gears 41, 42 and 43 are rotatably mounted by pins or shafts 44, 45 and 46, the shaft 45 being carried by the plate 38 and the shafts 44 and 46 being rotatably mounted through the plate 38 and the bottom of the casing and carrying turning knobs 47 at their lower ends, so that these shafts may be manually turned when the lever is in its neutral position.

The upper portions of the shafts 44 and 46 which project from the plate 38 are squared for gripping engagement with the sleeves 48, which are fitted about the same and extend upwardly from the plate 38. These sleeves are to receive the spools 49 upon which the paper strip is wound, and in order to effect good gripping engagement between the sleeves and the spools, the sleeves are slit longitudinally from their upper ends, as shown at 50, and the cover or upper section 2 of the casing carries depending wedges 51 which engage in upper ends of the sleeves and spread them sufficiently to grip the spools. While the sleeves will be spread by the wedges, they may turn about these wedges and the paper strip may be wound from one spool to the other. After a spool of tape or paper strip has been applied to one sleeve, the paper strip is engaged with one of the guide rollers 52, then extended across the front of the cover, and, after being engaged with the other guide roller, is attached to an empty spool. The casing may then be swung upwardly into engagement with the cover and the sleeves will be spread into gripping engagement with the spools.

The lever is then turned to the right or left for transmitting rotary motion to the sleeve carrying the empty spool while leaving the other spool and the shaft carrying the same, free to turn as an idle shaft and sleeve, and the paper strip will be unwound from the idle spool and onto the power driven spool when the motor vehicle is in motion. As the paper strip moves across the front wall 4 of the casing, the road 52 marked upon the strip will be seen through the glass 9 and by observing its relation to the arrow 53, the driver of the vehicle may ascertain his location. The paper strip not only shows the road along which the vehicle is moving, and its location thereon, but also bears indicia as to road conditions, towns and cities, gas stations, and other information of value to the driver of the vehicle. The arrow is shiftable by grasping the knob and sliding the arrow longitudinally of the slot 55. Therefore, if it is found that the arrow is not accurately located with respect to points along the road, when the paper strip is inserted, it is merely necessary to shift the arrow toward the right or left to correct the error. The reading of the guide strip will then be accurate, as the gearing is of such ratio that the strip will move in scaled relation to the mileage of the road.

Resilient strips 55, carried by posts 56 rising from the plate 38, are provided for bearing against the rolls of paper strip and holding it smoothly wound. There has also been provided a socket 57 carrying a lamp bulb 58 for illuminating the interior of the casing so that the guide may be seen when driving at night.

Having thus described the invention, what is claimed is:

1. A travel guide comprising a casing having a wall formed with a sight opening, a cover for said casing, a horizontal plate in said casing, shafts journaled through said plate, sleeves carried by said shafts and projecting upwardly therefrom to engage through spools, said sleeves being split from their upper ends, wedges carried by said cover for engaging in the upper ends of said sleeves and spreading the sleeves into frictional gripping engagement with the spools when the cover is in closing relation to the casing, gears carried by the lower ends of said shafts, a drive shaft rotatably mounted in said casing, and a train of gearing for selectively transferring rotary motion from the drive shaft to the sleeve-carrying shafts including a lever pivotally mounted and carrying a gear for meshing with a selected one of the first gears when the lever is moved to an adjusted position.

2. A travel guide comprising a casing having a wall formed with a sight opening, a horizontal plate in said casing, shafts journaled vertically through said plate, sleeves carried by upper ends of said shafts for mounting spools between the plate and the top of said casing, pins for guiding a strip bearing travel directions across the sight opening from one spool to the other, a drive shaft rotatably mounted in said casing, gears carried by lower ends of said vertical shafts below said plate, and a train of gearing for transmitting rotary motion from said drive shaft to said vertical shafts including a lever pivotally mounted and projecting outwardly through a slot in the front wall of the casing, and a gear carried by said lever for selective meshing with the gears of the vertical shafts when the lever is swung horizontally from a neutral position toward a selected one of the vertical shafts.

3. A travel guide comprising a casing having a wall formed with a sight opening, a cover for said casing, a horizontal plate in said casing, shafts journaled through said plate, spool holders carried by said shafts and projecting upwardly therefrom to engage through spools, means carried by said cover for expanding said spool holders to frictionally grip the spools when the cover is in closing relation to the casing, means for guiding a strip bearing travel directions across the sight opening from one spool to the other, a drive shaft rotatably mounted in said casing, and gearing for transmitting rotary motion from said drive shaft to a selected vertical shaft including gears carried by the vertical shafts below said plate, and a lever pivotally mounted and carrying a gear for meshing with a gear of a selected vertical shaft when the lever is swung from a neutral position toward the selected vertical shaft.

4. A travel guide comprising a casing having a front wall formed with a sight opening, the bottom of said casing having its intermediate portion depressed to form a recess, vertical shafts journaled through the bottom at right and left hand sides of said recess and provided with turning knobs at their lower ends, sleeves carried by upper ends of said shafts for carrying spools, a strip bearing travel directions wound upon one spool and adapted to be displayed through the sight opening when unwound from said spool and wound upon the other spool, gears carried by said shafts and overlying said recess, a drive shaft rotatably mounted in the rear portion of said casing transversely thereof, and a train of gearing in said recess for transmitting rotary motion from said drive shaft to a selected vertical shaft including a lever pivotally mounted in the recess and extending longitudinally therein with its forward portion projecting outwardly through a slot in the front wall of the casing, and a gear rotatably carried by said lever and being of a diameter disposing it out of engagement with the gears of both vertical shafts when the lever is in a neutral position midway the width of said slot.

5. A travel guide comprising a casing having a front wall formed with a sight opening, the bottom of said casing having its intermediate portion depressed to form a recess, vertical shafts journaled through the bottom at right and left hand sides of said recess and provided with turning knobs at their lower ends, sleeves carried by upper ends of said shafts for carrying spools, a strip bearing travel directions wound upon one spool and adapted to be displayed through the sight opening when unwound from said spool and wound upon the other spool, gears carried by said shafts and overlying said recess, a drive shaft rotatably mounted in the rear portion of said casing transversely thereof, and a train of gearing in said recess for transmitting rotary motion from said drive shaft to a selected vertical shaft including a lever pivotally mounted in the recess and extending longitudinally therein with its forward portion projecting outwardly through a slot in the front wall of the casing, a gear rotatably carried by said lever and disposed out of engagement with the gears of both vertical shafts when the lever is in a neutral position midway the width of said slot, and resilient means for holding the lever in a set position when the lever is swung transversely past a dead center to dispose its gear in mesh with the gear of a selected vertical shaft.

6. A travel guide comprising a casing having a front wall formed with a sight opening, the bottom of said casing having its intermediate portion depressed to form a recess, vertical shafts journaled through the bottom at right and left hand sides of said recess and provided with turning knobs at their lower ends, sleeves carried by upper ends of said shafts for carrying spools, a strip bearing travel directions wound upon one spool and adapted to be displayed through the sight opening when unwound from said spool and wound upon the other spool, a pointer carried by the front wall of the casing and extending vertically in the sight opening for overlying the strip, said pointer being shiftable longitudinally of the sight opening to adjusted positions, gears carried by lower ends of said shafts, a drive shaft rotatably mounted in said casing, and gearing for transmitting rotary motion from said drive shaft to a selected vertical shaft including a pivoted lever extending longitudinally in the recess between the gears of the vertical shafts and carrying a gear out of mesh with gears of both vertical shafts when the lever is in a neutral position, and means for holding said lever in set position with its gear in cooperating relation to the gear of a selected one of the vertical shafts.

7. A travel guide comprising a casing, a cover for said casing hinged thereto, said casing having a front wall formed with a sight opening, the bottom of the casing having a depressed portion forming a pocket, a drive shaft extending transversely across the rear end of the casing and rotatably mounted, an end of said shaft being adapted for connection with a power shaft, a worm carried by said drive shaft, a worm gear rotatably mounted under said worm and meshing therewith, a beveled pinion carried by said worm shaft, a horizontal plate in said casing, a large beveled gear rotatably mounted in said pocket and meshing with the beveled pinion, a spur gear carried by said beveled gear, a lever pivoted for horizontal swinging movement concentric to the large gear and spur gear and having its free end portion projecting outwardly through a slot in the front wall of the casing under the sight opening, a spring carried by said plate, a pull wire extending longitudinally of said lever with its front end secured to the lever and its rear end attached to said spring, the spring and rod serving as means for holding the lever in an adjusted position, shafts journaled through said plate in spaced relation to opposite sides of said lever, a sleeve carried by the upper end of each shaft for carrying a spool, means for guiding a strip bearing travel data across the sight opening from one spool to another, large spur gears carried by lower ends of said shafts under said plate, a large spur gear carried by said lever and meshing with the first spur gear, a smaller spur gear concentric with the spur gear carried by said lever for meshing with the large spur gear at one side of the lever when the lever is moved to one position of adjustment, and a spur pinion meshing with the large gear at the other side of the lever and disposed in position for engagement by said smaller gear carried by the lever when the lever is moved toward the same to a position of adjustment for reversing directional movement of the strip bearing travel data.

JUSTICE R. MALEY.
WILLIAM S. CARVER.